US009041230B2

(12) United States Patent
Arnold et al.

(10) Patent No.: US 9,041,230 B2
(45) Date of Patent: May 26, 2015

(54) METHOD AND APPARATUS FOR MOTIONAL/VIBRATIONAL ENERGY HARVESTING VIA ELECTROMAGNETIC INDUCTION USING A MAGNET ARRAY

(75) Inventors: David P. Arnold, Gainesville, FL (US); Shuo Cheng, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 991 days.

(21) Appl. No.: 12/968,860

(22) Filed: Dec. 15, 2010

(65) Prior Publication Data

US 2011/0140458 A1 Jun. 16, 2011

Related U.S. Application Data

(60) Provisional application No. 61/286,621, filed on Dec. 15, 2009.

(51) Int. Cl.
*F02B 63/04* (2006.01)
*H02K 35/04* (2006.01)

(52) U.S. Cl.
CPC ...................... *H02K 35/04* (2013.01)

(58) Field of Classification Search
USPC ......... 290/1 R, 42, 53; 310/36, 28, 30, 16, 27
See application file for complete search history.

(56) References Cited

U.S. PATENT DOCUMENTS 3,076,153 A * 1/1963 Rieckman et al. ....... 331/116 M
3,696,251 A * 10/1972 Last et al. ...................... 290/53

6,054,789 A * 4/2000 Leupold .................... 310/156.43
6,376,959 B1 * 4/2002 Leupold ......................... 310/166

(Continued)

FOREIGN PATENT DOCUMENTS

WO WO 2009/003915 A1 * 1/2009

OTHER PUBLICATIONS

Cheng, S., et al., "Modeling of Magnetic Vibrational Energy Harvesters Using Equivalent Circuit Representations," *Journal of Micromechanics and Microengineering*, Nov. 2007, pp. 2328-2335, vol. 17, No. 11.

(Continued)

*Primary Examiner* — Julio C. Gonzalez
(74) *Attorney, Agent, or Firm* — Saliwanchik, Lloyd & Eisenschenk

(57) ABSTRACT

Embodiments of the subject invention pertain to a method and apparatus for vibrational energy harvesting via electromagnetic induction using a magnet array. Specific embodiments of the subject invention incorporate at least one conductive coil and at least one magnet array. Magnets used in such magnet arrays can be permanent magnets of various shapes, such as arc-shaped, square, rectangular, wedge, or trapezoidal. These magnet arrays can then be, for example, circular, hexagonal, rectangular, or square in external shape and create various types of internal magnetic fields, such as dipole, quadrupole, hexapole, or octapole magnetic fields. Through use of a magnet array, embodiments of the invention can increase the strength of magnetic fields by approximately 10 times compared to typical vibrational energy harvesters. The 10 time increase in the strength of the magnetic fields can result in up to a 100-fold increase in power. Preferably, the magnetic fields created by the subject device are substantially, if not completely, enclosed within the device.

33 Claims, 15 Drawing Sheets

2D Rotation and/or Translation (springs)

(56) References Cited

U.S. PATENT DOCUMENTS

| | | | |
|---|---|---|---|
| 6,680,663 B1 | 1/2004 | Lee et al. | |
| 6,768,407 B2 | 7/2004 | Kohda et al. | |
| 7,009,315 B2* | 3/2006 | Takeuchi | 310/15 |
| 7,089,043 B2* | 8/2006 | Tu et al. | 455/573 |
| 7,164,212 B2* | 1/2007 | Leijon et al. | 290/42 |
| 7,323,790 B2* | 1/2008 | Taylor et al. | 290/42 |
| 7,362,003 B2* | 4/2008 | Stewart et al. | 290/42 |
| 2001/0007400 A1* | 7/2001 | Griswold | 310/14 |
| 2004/0104794 A1 | 6/2004 | Kohda et al. | |
| 2005/0162250 A1 | 7/2005 | Higuchi | |
| 2005/0212365 A1* | 9/2005 | Kraus et al. | 310/36 |
| 2008/0001484 A1* | 1/2008 | Fuller et al. | 310/15 |
| 2008/0296984 A1* | 12/2008 | Honma et al. | 310/17 |
| 2010/0176665 A1* | 7/2010 | Shen | 310/36 |
| 2010/0187835 A1* | 7/2010 | Hohlfeld et al. | 290/1 R |
| 2010/0194117 A1* | 8/2010 | Pabon et al. | 290/1 R |

OTHER PUBLICATIONS

Cugat, O., et al., "Permanent Magnet Variable Flux Sources," *IEEE Transactions on Magnetics*, Nov. 1994, pp. 4602-4604, vol. 30, No. 6.

Dempsey, N.M., et al., "High Performance Hard Magnetic NdFeB Thick Films for Integration Into Micro-Electro-Mechanical Systems," *Applied Physics Letters*, Feb. 2007, Article No. 092509, vol. 90, No. 9.

Hills, B.P., et al., "A Low-Field, Low-Cost Halbach Magnet Array for Open-Access NMR," *Journal of Magnetic Resonance*, Aug. 2005, pp. 336-339, vol. 175, No. 2.

Mitcheson, P.D., et al., "Performance Limits of the Three MEMS Inertial Energy Generator Transduction Types," 2007, *Journal of Micromechanics and Microengineering*, pp. S211-S216, vol. 17.

* cited by examiner

2D Rotation and/or Translation (free)

2D Rotation and/or Translation (springs)

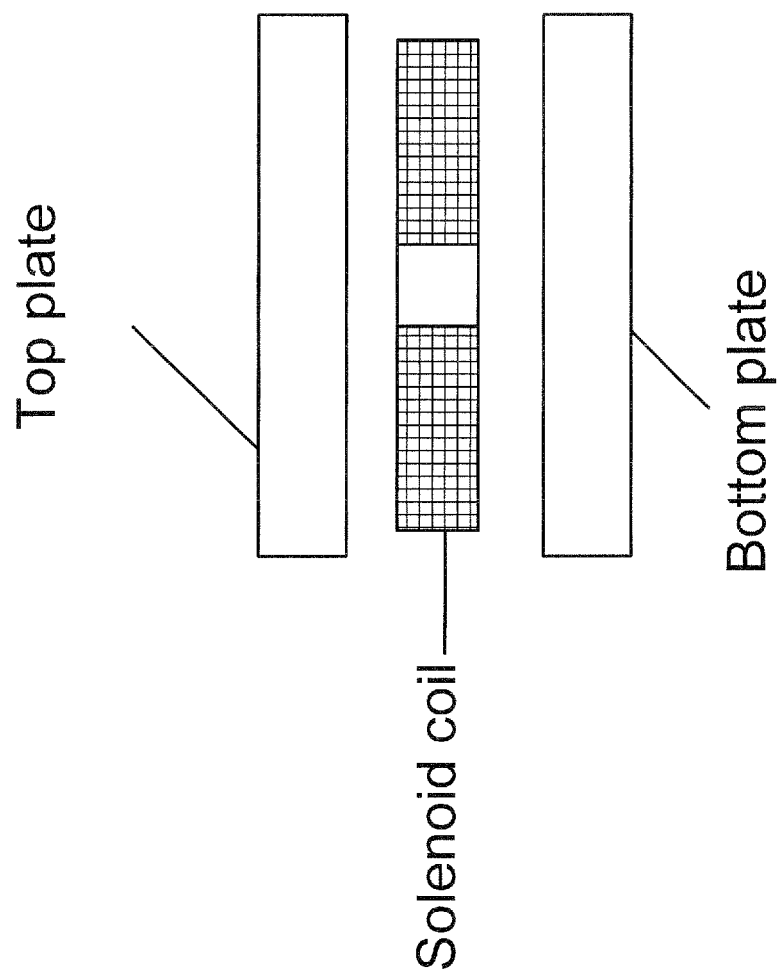
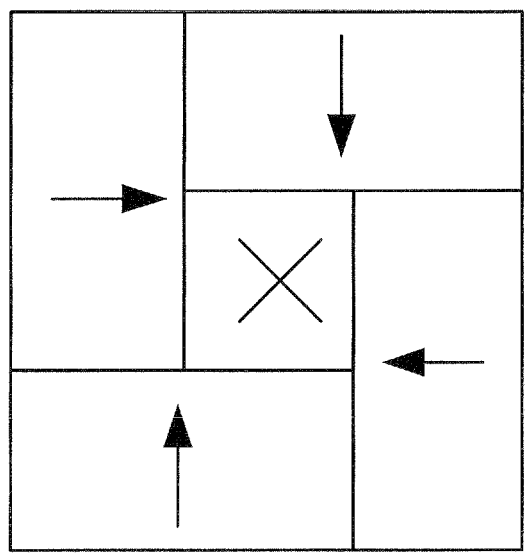
FIG. 11A  Side view
FIG. 11B  Top view

METHOD AND APPARATUS FOR MOTIONAL/VIBRATIONAL ENERGY HARVESTING VIA ELECTROMAGNETIC INDUCTION USING A MAGNET ARRAY

CROSS-REFERENCE TO RELATED APPLICATION(S)

The subject application claims the benefit of U.S. Provisional patent application No. 61/286,621, filed Dec. 15, 2009 which is hereby incorporated by reference herein in its entirety, including any figures, tables, or drawings.

BACKGROUND OF INVENTION

Long lasting, high power density power sources are important to enable emerging technologies such as wireless sensor networks, robotic platforms, and electronic devices for consumer, military, medical, aerospace and other applications. To meet the energy demands for these applications, devices that scavenge power from the environment (e.g., solar, thermal, vibrations) are of great practical interest. Various energy harvesting and scavenging methods exist for capturing and storing energy from normally occurring environmental sources, such as thermal, solar, or vibrational. For applications on moving platforms, vibrational energy harvesters are advantageous since solar or thermal energy may not be available under all operating conditions.

Current research has focused on a variety of vibrational energy harvesting devices. For example, micromachining and micro-electro-mechanical system (MEMS) technologies have been used to produce sub-millimeter microchip-sized devices, but the power output from these miniaturized devices has been very low (often nW-μW level), which appears to be too small to power many practical devices. The paper entitled "Performance limits of the three MEMS inertial energy generator transduction types," by P. D. Mitcheson, et al. (*J. Micromech. Microeng.*, vol. 17, S211-S216, 2007) shows that the power density scales unfavorably with length scale.

Most electromagnetic vibrational energy harvesters suffer from weak magnetic fields, which ultimately hampers their performance. For example, in many electromagnetic vibrational energy harvesters, one or two moving magnets are used in an open-field configuration, where soft magnetic cores typically need to be introduced in order to increase the magnetic flux density and, thus, increase the output of power. Unfortunately, the introduction of these soft magnetic cores to the open-field configuration can lead to high attractive magnetic forces, which may negatively impact the motion of the magnet in the configuration. Introduction of soft magnetic cores can also cause the magnet to no longer readily move under external vibration. Practical implementation of these magnetically-based vibrational energy harvesters can also be difficult as the static stray magnetic fields are difficult to shield. Accordingly, magnetically based energy harvesters also tend to be magnetically attracted to ferrous objects external to the harvester, which may interfere with the harvester's operation. Another potential issue with these harvesters is that the magnetic fields can adversely affect surrounding structures. Therefore, there is a need for an electromagnetic vibrational energy harvester that creates a strong magnetic field, where the strong magnetic field is largely, if not entirely, within the device.

BRIEF SUMMARY

Embodiments of the subject invention pertain to a method and apparatus for producing an electric current. Embodiments of the subject invention also pertain to a method and apparatus for motional/vibrational energy harvesting via electromagnetic induction. Specific embodiments relate to non-resonant motional/vibrational energy harvesting.

Embodiments of the subject invention pertain to a method and apparatus for vibrational energy harvesting via electromagnetic induction using a magnet array. Specific embodiments of the subject invention incorporate at least one conductive coil and at least one magnet array. Magnets used in such magnet arrays can be permanent magnets of various shapes, such as arc-shaped, square, rectangular, wedge, or trapezoidal. These magnet arrays can then be, for example, circular, hexagonal, rectangular, or square in external shape and create various types of internal magnetic fields, such as dipole, quadrupole, hexapole, or octapole magnetic fields. Through use of a magnet array, embodiments of the invention can increase the strength of magnetic fields by approximately 10 times compared to typical vibrational energy harvesters. The 10 time increase in the strength of the magnetic fields can result in up to a 100-fold increase in power. Preferably, the magnetic fields created by the subject device are substantially, if not completely, enclosed within the device.

Specific embodiments of the subject invention can use a magnet array, such as Halbach array. A specific embodiment can use a Halbach cylinder type Halbach array. Halbach arrays used in conjunction with the embodiments of the invention can incorporate ferromagnetic material and establish strong magnetic fields, while also largely retaining these magnetic fields inside the device. Multi-Telsa fields can be accomplished within the device. Accordingly, use of a Halbach array, such as a Halbach cylinder, as a magnet array allows for large voltage induction, while providing good shielding for the magnetic induction energy harvesters.

Applications of the non-resonant motional/vibrational energy harvesting devices include, but are not limited to consumer electronics, military subsystems, robotic platforms, and sensor networks.

BRIEF DESCRIPTION OF DRAWINGS

FIG. 1A shows no internal field pattern; FIG. 1B shows a dipole internal field pattern; FIG. 1C shows a quadrupole internal field pattern; and FIG. 1D shows a hexapole internal field pattern.

FIGS. 11A and 11B show side and top views, respectively, of an embodiment for magnetic induction.

DETAILED DISCLOSURE

Embodiments of the subject invention relate to a method and apparatus for producing an electric current. Embodiments of the subject invention also pertain to a method and apparatus for motional/vibrational energy harvesting via electromagnetic induction. Specific embodiments relate to non-resonant motional/vibrational energy harvesting.

Embodiments of the subject invention pertain to a method and apparatus for vibrational energy harvesting via electromagnetic induction using a magnet array. Specific embodiments of the subject invention incorporate at least one conductive coil and at least one magnet array. Magnets used in such magnet arrays can be permanent magnets of various shapes, such as arc-shaped, square, rectangular, wedge, or trapezoidal. These magnet arrays can then be, for example, circular, hexagonal, rectangular, or square in external shape and create various types of internal magnetic fields, such as dipole, quadrupole, hexapole, or octapole magnetic fields. Through use of a magnet array, embodiments of the invention can increase the strength of magnetic fields by approximately 10 times compared to typical vibrational energy harvesters. The 10 time increase in the strength of the magnetic fields can result in up to a 100-fold increase in power. Preferably, the magnetic fields created by the subject device are substantially, if not completely, enclosed within the device.

Specific embodiments of the subject invention can use a magnet array, such as Halbach array. A specific embodiment can use a Halbach cylinder type Halbach array. Halbach arrays used in conjunction with the embodiments of the invention can incorporate ferromagnetic material and establishes strong magnetic fields, while also largely retaining these magnetic fields inside the device. Multi-Telsa fields can be accomplished within the device. Accordingly, use of a Halbach array, such as a Halbach cylinder, as a magnet array allows for large voltage induction, while providing good shielding for the magnetic induction energy harvesters.

Embodiments of the subject invention relate to a compact electromagnetic generator architecture capable of enabling high-energy-density motional power sources. Applications of the electromagnetic generator architecture of the present invention include, but are not limited to, consumer electronics, military subsystems, robotic platforms, and sensor networks.

Figures 1A, 1B, 1C, 1D:
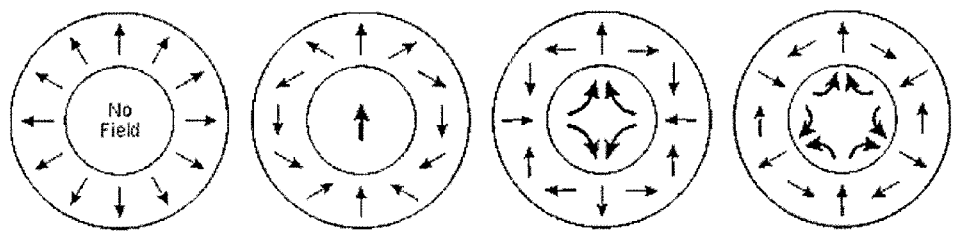
FIGS. 1A-1D show a "mathematically perfect" Halbach cylinder, where the magnetization direction continuously varies so that the magnetic flux produced inside the cylinder is perfectly uniform, as well as confined to the inside of the cylinder, where

FIGS. 1A-1D show a "mathematically perfect" Halbach cylinder, where the magnetization direction continuously varies so that the magnetic flux produced inside the cylinder is perfectly uniform, as well as confined to the inside of the cylinder. FIG. 1A shows no internal field pattern, where k=1; FIG. 1B shows a dipole internal field pattern, where k=2; FIG. 1C shows a quadrupole internal field pattern, where k=3; and FIG. 1D shows a hexapole internal field pattern, where k=4, where a positive value for k indicates an internal magnetic field, while a negative value for k indicates an external magnetic field.

Figure 2:
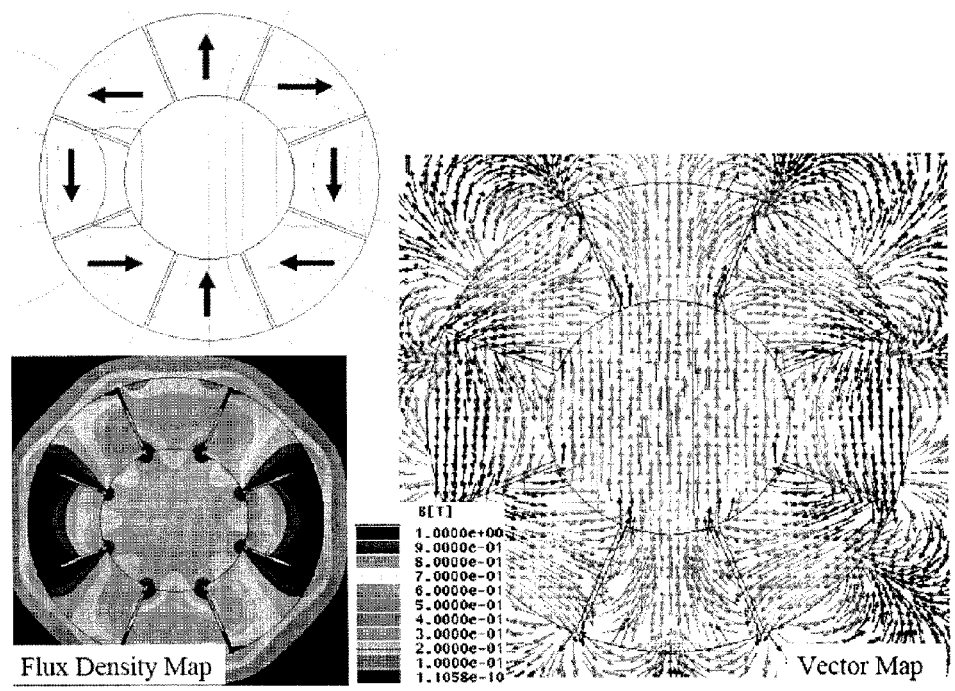
FIG. 2 shows a Halbach cylinder dipole magnet using arc-shaped segments, in accordance with an embodiment of the subject invention.
Figure 3:
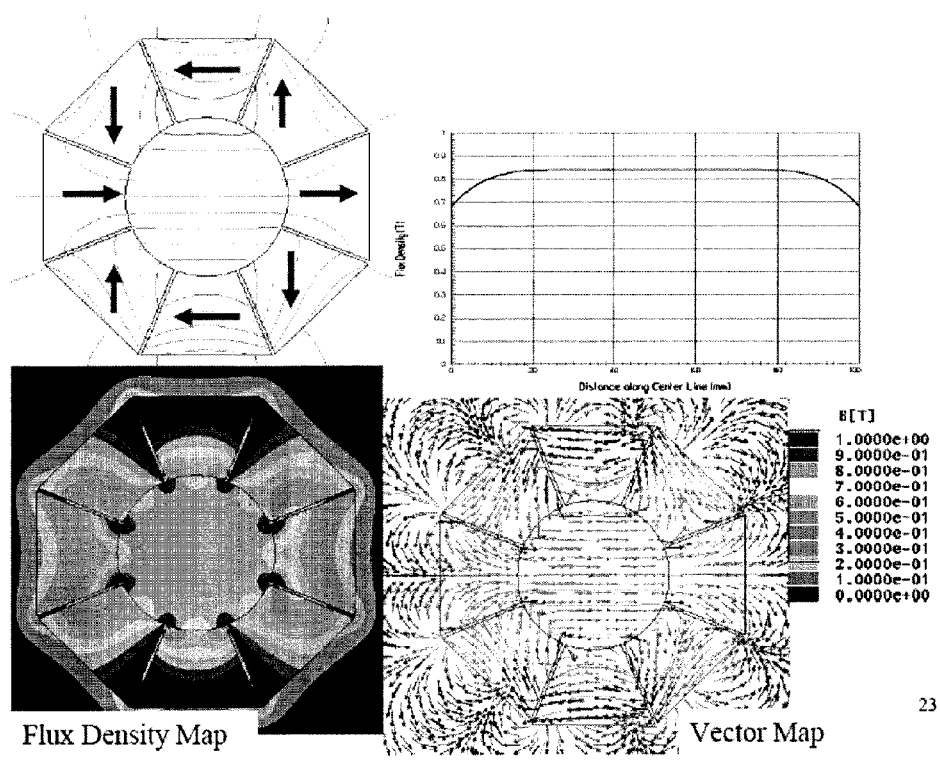
FIG. 3 shows a Halbach cylinder dipole magnet using trapezoidal-shaped segments, in accordance with an embodiment of the subject invention.
Figure 4:
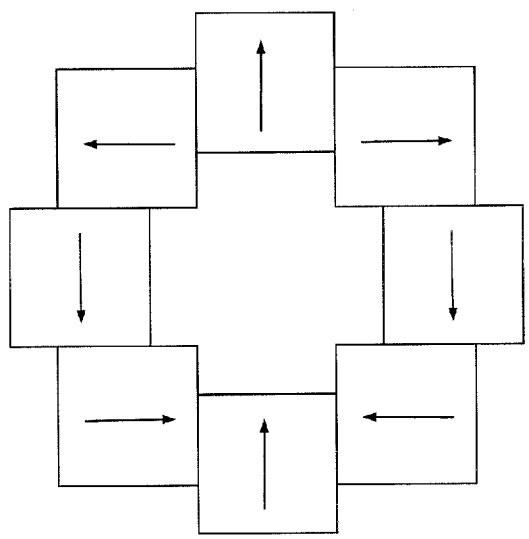
FIG. 4 shows a Halbach cylinder dipole magnet using square-shaped segments, in accordance with an embodiment of the subject invention.
Figure 5:
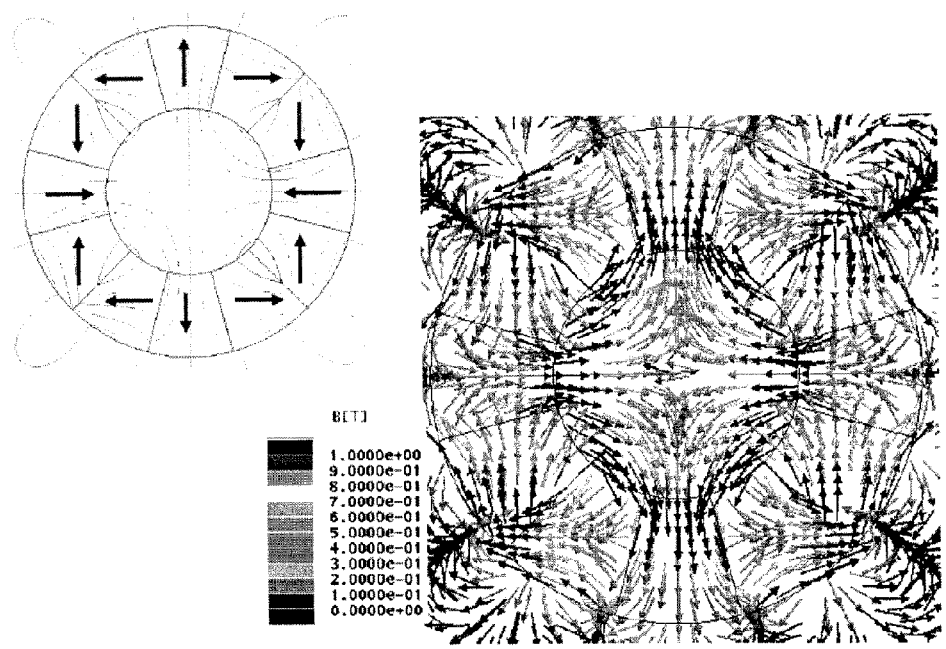
FIG. 5 shows a Halbach cylinder quadrupole magnet using arc-shaped segments, in accordance with an embodiment of the subject invention.

A Halbach cylinder dipole magnet is shown in FIGS. 2-4. The magnet may use arc-shaped segments as shown in FIG. 2, trapezoidal-shaped segments as shown in FIG. 3, or square-shaped segments as shown in FIG. 4. A Halbach cylinder quadrupole magnet may also use arc-shaped segments as shown in FIG. 5. In a specific embodiment, the magnetic field directions can change continuously over the body of the tubular body. Various embodiments can use magnet arrays that are not "mathematically perfect" Halbach cylinders but are approximations of the same. Specific embodiments can have some magnetic fields external to the cylinder and/or have internal magnetic fields that are not symmetric with respect to the axis of cross sections of the cylinder. Further, the internal cross-section can be other shapes than circular, such as square, rectangular, hexagonal, or other irregular shaped.

Other shapes of Halbach arrays, or approximations thereof, can also be used, such as, but not limited to, spherical, cubic, and other three dimensional magnet arrays that create a cavity or volume with magnetic fields and regions outside of the created cavity or volume, and outside of the magnet bodies of the magnet array, where there are small, or no, magnetic fields. Specific embodiments create cavities or volumes with magnetic fields therein, such that the maximum magnetic field outside of the cavity or volume, and outside of the magnets of the magnet array is less than or equal to 20%, less than or equal to, 10%, less than or equal to 5%, less than or equal to 2%, less than or equal to 1%, less than or equal to 0.5%, and/or less than or equal to 0.2% of the maximum magnetic field within the cavity or volume.

An electromagnetic vibrational energy harvester relies on Faraday's law of magnetic induction in order to harvest vibrational energy. The voltage, V, induced in an N-turn conductive coil, is proportional to the time-rate-change of magnetic flux, Φ, through the coil, as shown in Equation 1:

$$V = -N\frac{d\Phi}{dt}. \quad (1)$$

The magnetic flux is then given by the surface integral of the B-field normal to the surface, as shown in Equation 2:

$$\Phi = \int_S B \cdot d\bar{s}. \quad (2)$$

As the value of B increases, more voltage can be induced, and consequently, more power can be generated from the harvester.

To enact magnetic induction in an energy harvester, the magnet array can move with respect to the coil assembly. With respect to an external frame of reference, the coil assembly may be moving while the magnet array is fixed, the magnet array may move while the coil assembly is fixed, or the coil assembly and the magnet can both move such that they move with respect to each other.

Figure 6A:
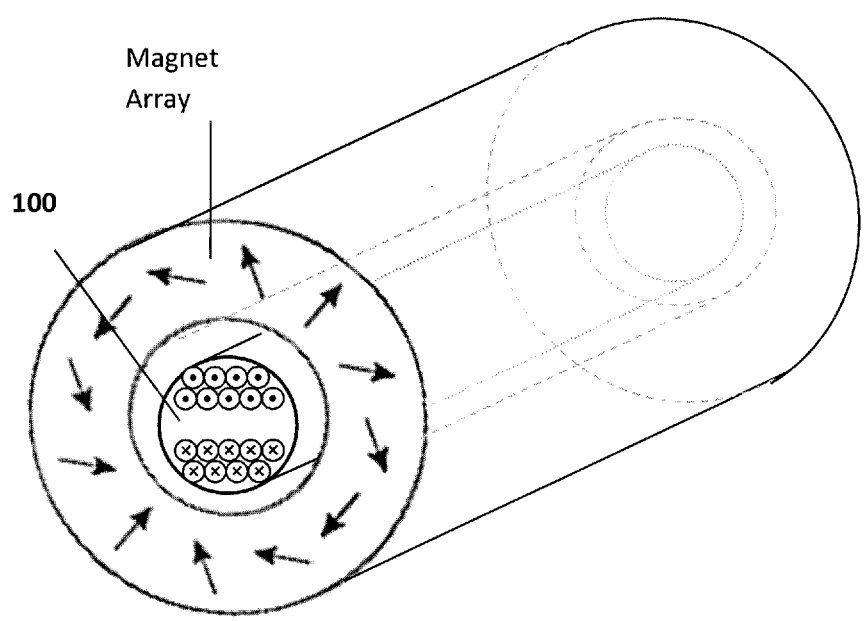
FIG. 6A shows a three-dimensional (3-D) depiction of a cylindrical conductive coil assembly placed inside of a "mathematically perfect" Halbach cylinder magnet array, where external motion can cause relative motion between the coil assembly and the magnet array, in accordance with an embodiment of the subject invention.
Figure 6B:
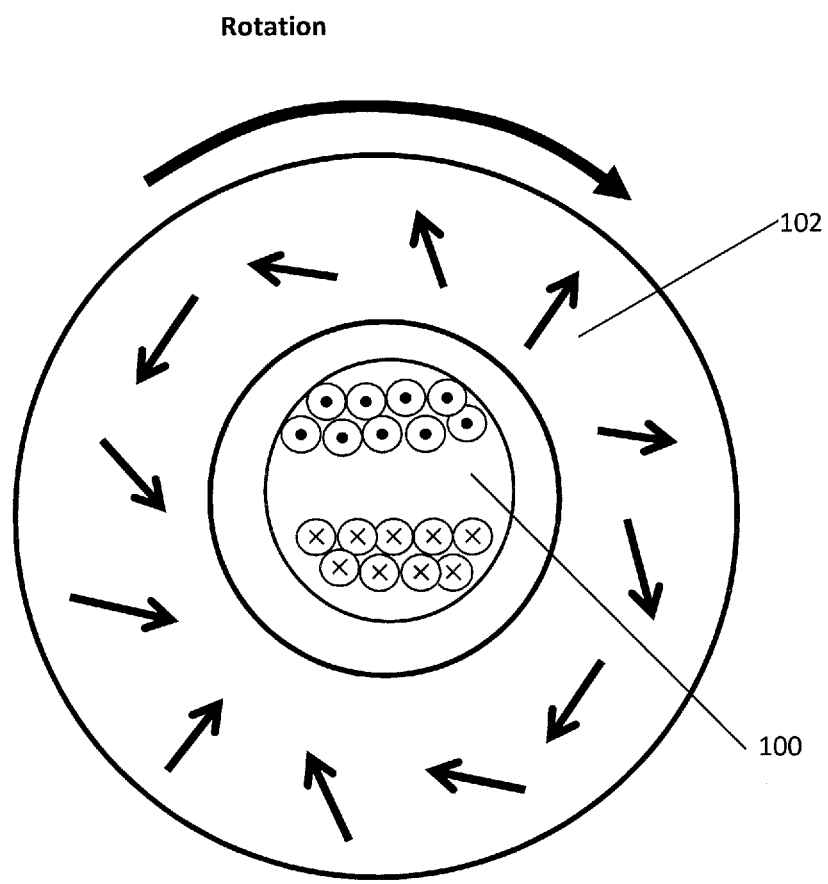
FIG. 6B shows the end of the cylindrical conductive coil assembly and the "mathematically perfect" Halbach cylinder magnet array shown in FIG. 6A, with the rotational direction of the array also shown, in accordance with an embodiment of the subject invention.

A specific embodiment of the subject invention is shown in FIGS. 6A-6B. FIG. 6A shows a three-dimensional (3-D) depiction of a cylindrical coil assembly 100 placed inside of a cylinder magnet array. External motion can cause relative motion between the coil assembly 100 and magnet array in order to cause magnetic induction as discussed above. FIG. 6B shows an end of the cylindrical coil assembly 100 and cylinder dipole magnet array 102 shown in FIG. 6A, along with a rotational direction of the array, where cross-sections of the ends of the longitudinal portions of the coil are shown with the direction of the winding indicated by dots (out of page) and X's (into the page). In this embodiment, the magnetic field is uniform inside the cylinder. To realize time-varying magnetic flux inside the cylinder, the coil assembly and magnet array can, for example, rotate with respect to one another. Such rotation can be substantial with respect to the longitudinal axis of the cylinder and the longitudinal axis of the coil, or due to pivoting of the cylinder and the coil so as to change the angle between the longitudinal axis of the cylinder and the longitudinal axis of the coil.

Figure 7A:
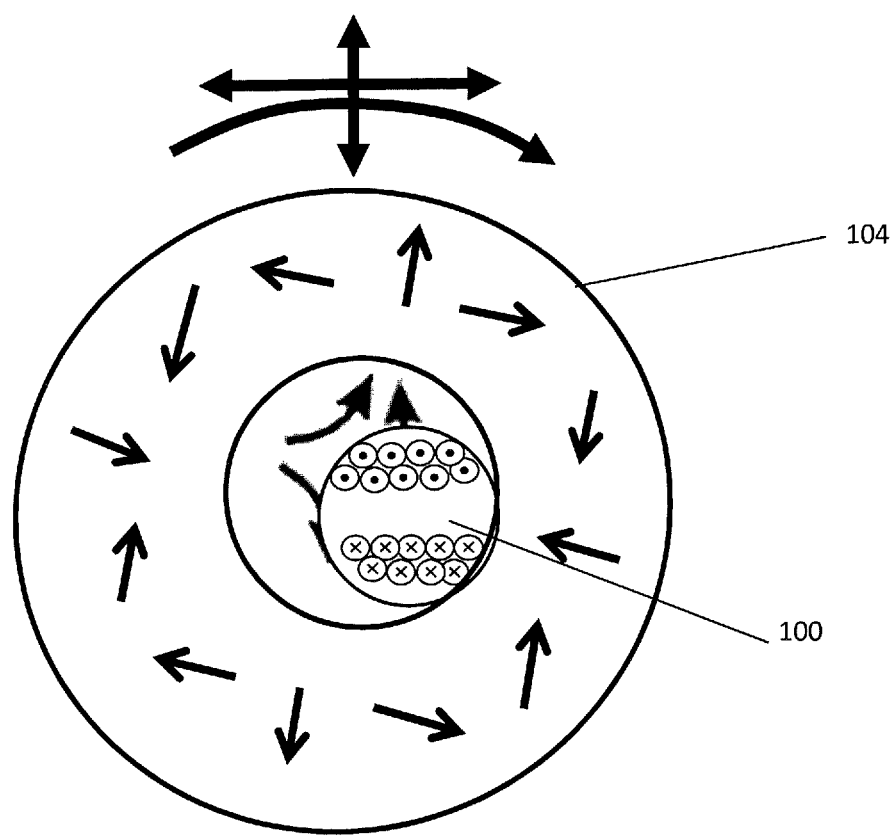
FIG. 7A shows an end of the cylindrical conductive coil assembly and Halbach cylinder quadrupole magnet array, with the rotational and translational direction of the array also shown, in accordance with an embodiment of the subject invention.
Figure 7B:
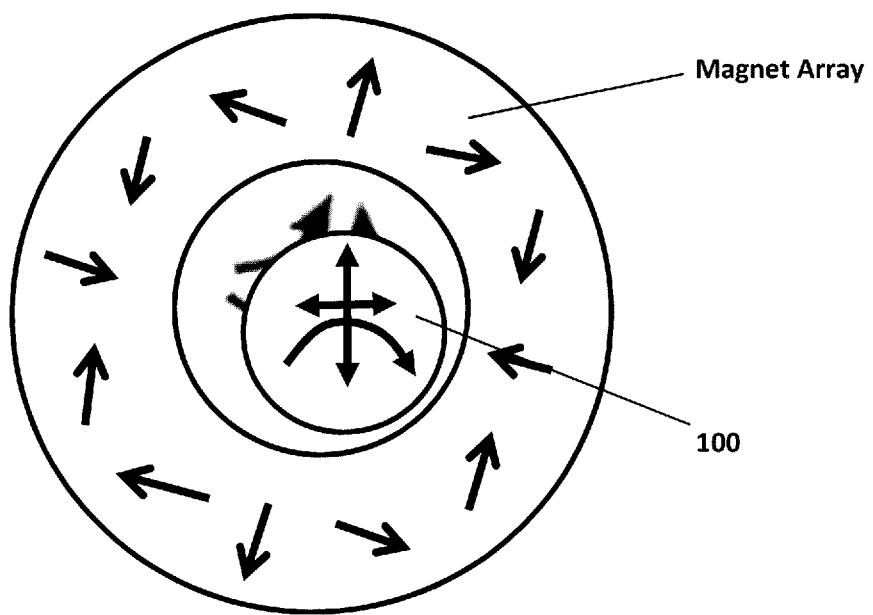
FIG. 7B shows an end of the cylindrical conductive coil assembly and Halbach cylinder quadrupole magnet array, with the unconstrained rotational and translational direction of the assembly also shown, in accordance with an embodiment of the subject invention.
Figure 7C:
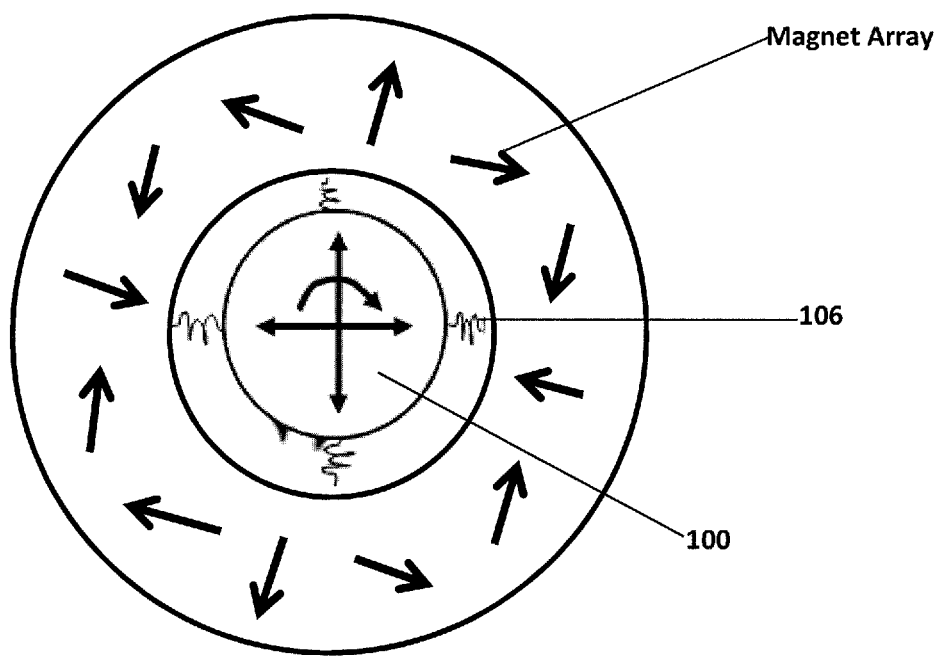
FIG. 7C shows an end of the cylindrical conductive coil assembly and a Halbach cylinder quadrupole magnet array, with the constrained rotational and translational direction of the assembly also shown, where the rotation and translation is constrained by springs.

Another embodiment of the subject invention is illustrated in FIGS. 7A-7C. FIG. 7A shows an end of the cylindrical coil assembly 100 and a cylinder quadrupole magnet array 104, along with the rotational and translational direction of the array, where cross-sections of the ends of the longitudinal portions of the coil are shown with the direction of the winding indicated by dots (out of page) and X's (into the page). When using the quadrupole magnet array as shown in FIG. 7A, the field is non-uniform inside the cylinder and resembles two opposing magnetic poles. To realize time-varying magnetic flux inside the cylinder, many different relative motions between the cylinder and coil can be realized, such as rotation, translation, and/or pivoting. These different relative motions between the cylinder then induce a voltage and/or current in the coil. Rotational or translational motion may be largely unconstrained, as shown in FIGS. 7A and 7B, or constrained as shown in FIG. 7C. FIG. 7B shows an end of the cylindrical coil assembly 100 and a cylinder quadrupole magnet array 104, along with the rotational and translational direction of the array, where the direction of the rotation and translation is unconstrained. Rotational or translational motion may optionally be constrained by springs or flexures, as shown in FIG. 7C. FIG. 7C shows an end of the cylindrical coil assembly 100 and a cylinder quadrupole magnet array 104, along with the rotational and translational direction of the array, where the direction of the rotation and translation is constrained by the addition of springs or flexures 106.

Figure 8A:
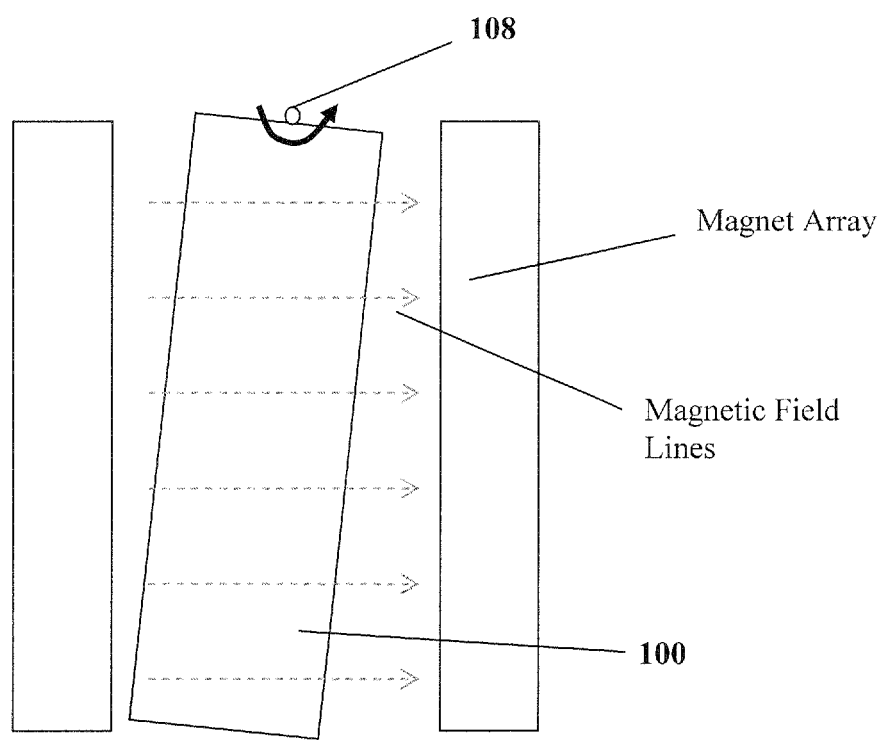
FIG. 8A shows a cylindrical conductive coil assembly and Halbach cylinder magnet array where the coil assembly pivots freely, in accordance with an embodiment of the subject invention.
Figure 8B:
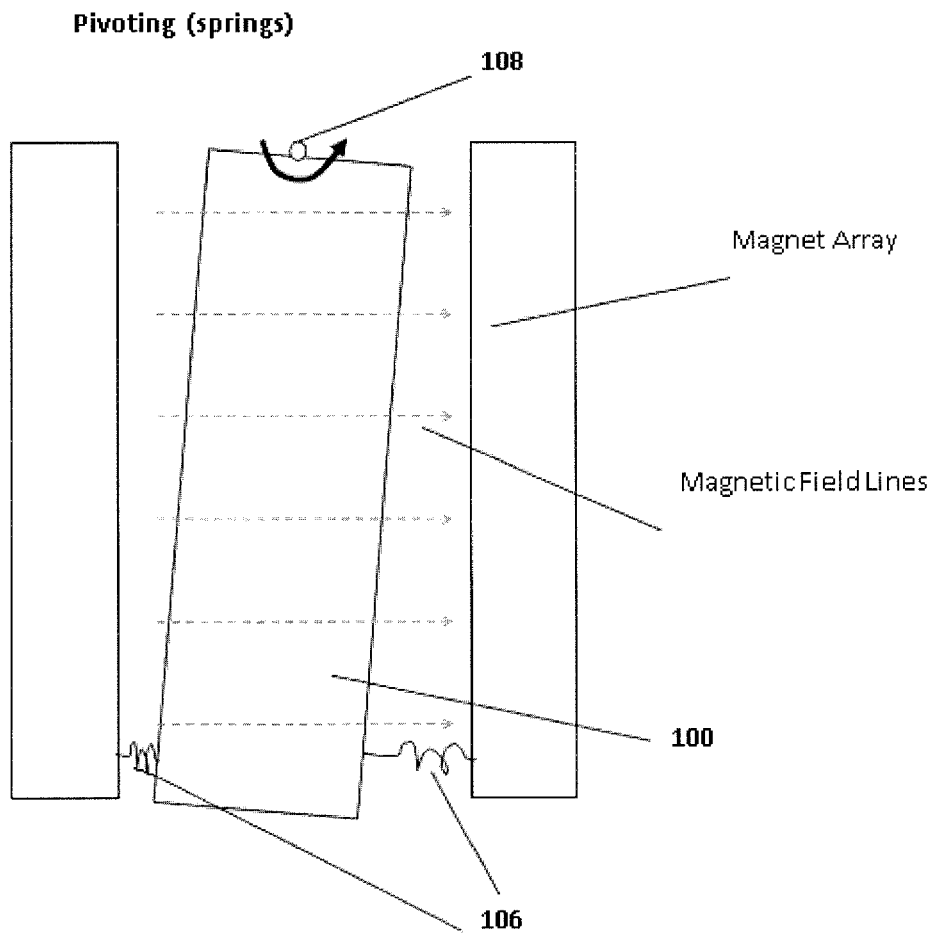
FIG. 8B shows a cylindrical conductive coil assembly and Halbach cylinder magnet array where the coil assembly's pivoting motion is constrained by springs, in accordance with an embodiment of the subject invention.

In specific embodiments of the invention, pivoting motion may also be used, as shown in FIGS. 8A and 8B. In FIGS. 8A and 8B, a pivot 108 is placed at the top of the cylindrical coil assembly 100. When pivoting occurs, a change in angle occurs between the long axis of the magnet array and the long axis of the coil assembly 100. FIG. 8A shows a cylindrical conductive coil assembly and cylinder magnet array where the coil assembly pivots freely, while FIG. 8B shows a cylindrical conductive coil assembly and cylinder magnet array where the coil assembly's pivoting motion is constrained by springs 106. This pivoting motion may be constrained to either 1-D rotation, similar to a regular playground swing, or, alternatively, to 2-D rotation, similar to a playground tire swing.

Figure 9:
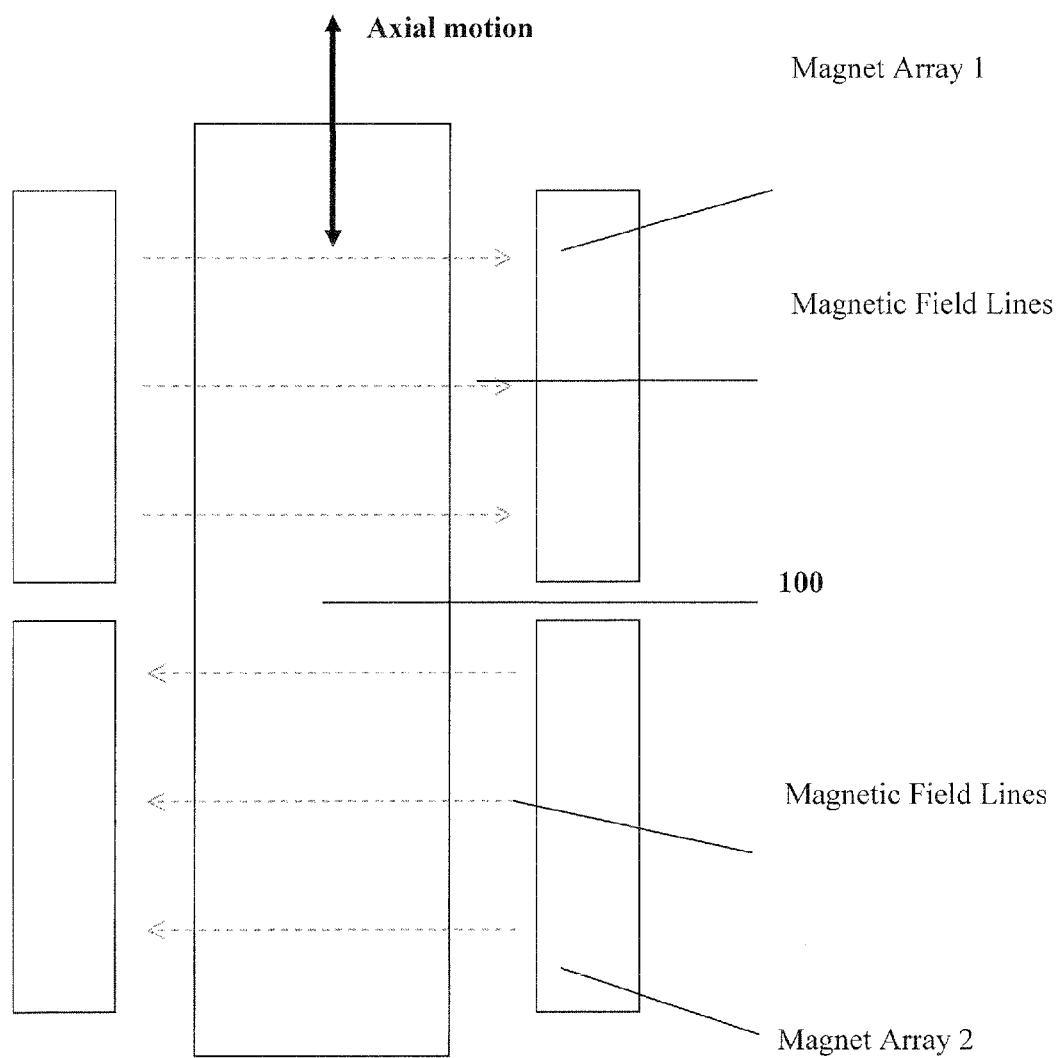
FIG. 9 shows a cylindrical conductive coil assembly placed inside two oppositely facing Halbach cylinder dipole magnet arrays where the assembly moves axially, in accordance with an embodiment of the subject invention.

In still further embodiments of the invention, other motional configurations, or relative motions between the cylinder and the coil may be realized using multiple cylindrical magnet arrays. For example, two oppositely facing cylinder dipole magnet arrays can be used to establish two magnetic fields acting in opposite directions, as shown in FIG. 9. FIG. 9 shows a coil assembly 100 placed inside two oppositely facing dipole cylinder dipole magnet arrays 102 where the assembly 100 moves axially. The coil assembly 100 placed inside and moved axially will sense a time-varying magnetic flux, and thus induce voltage. This could be further extended by stacking three, four, or more cylinder magnet arrays to achieve similar results.

The power output of an energy harvester is highly dependent on the electromechanical coupling factor, namely, electrical voltage generated per unit mechanical velocity. Accordingly, an energy harvester with high coupling factor is able to generate high voltage with small mechanical velocity. Embodiments of the invention can create a high coupling factor structure for the magnetic energy harvester.

According to Faraday's law, in a constant magnetic field, induction voltage generated on a moving conduction is given by:

$$EMF = (\vec{B} \times \vec{l}) \cdot \vec{v}$$

Where $\vec{B}$ is the flux density, $\vec{l}$ is the length of the conductor, and $\vec{v}$ is the velocity of the conductor. From this equation, given that the magnitude of $\vec{B}$, $\vec{l}$, and $\vec{v}$ are all fixed, EMF will be maximized when they are all perpendicular to each other.

Figure 10:
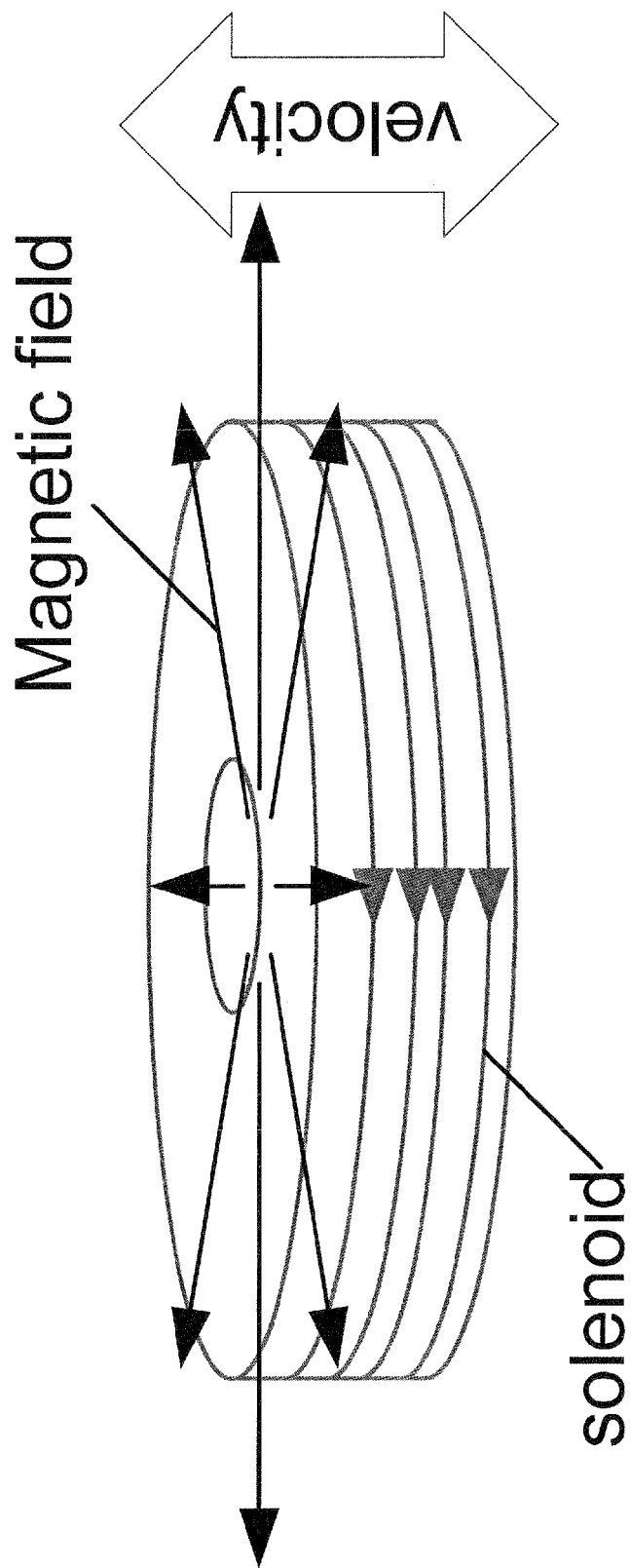
FIG. 10 shows a setup for an ideal case for magnetic induction in order to maximize EMF.

In order to create such a condition in a typical magnetic energy harvester, where a solenoid coil translates along its axis, a radial magnetic field that is perpendicular to the coil axis is desired, as shown in FIG. 10.

An arrangement of permanent magnets can be used to create strong radial field over a large area. In an embodiment, referring to FIGS. 11A-11B, a magnet assembly can use 2 plates, where each plate has five magnets. In the top plate, four of the magnets are rectangular and the other one is square. The rectangular magnets are arranged into a square loop and magnetized toward the center of the plate, and the square magnet fits into the center hole of the loop, magnetized downward. Magnetization of all the magnets can be reversed together. The bottom plate is parallel to the top plate and the magnetization pattern is the mirror image of the magnetization pattern for the top plate. The thickness of the plates and the gap between the two plates can be any value, and the thickness of the two plates can be the same or different. The magnets can be replaced by, for example, stacking multiple magnets. In a specific embodiment, the rectangular magnets can be replaced by two square magnets side by side with same magnetization direction. Other combinations of magnets of various shapes and sizes can also be used to accomplish the magnetization pattern.

With such a magnet assembly, when the gap between the two plates is less than twice the side length of the plates, a radial magnetic flux density of 0.5 T-1 T can be created between the two plates within the area occupied by the rectangular magnets loop. A solenoid coil can be placed between the two plates with an axis of the coil pointing to the center of the plates and perpendicular to the plane the plates lie in. Relative motion between the coil and the magnet assembly along the coil axis can be created by moving the coil and/or the magnet assembly in order to create magnetic induction and produce a voltage and/or current in the coil.

Figure 12B:
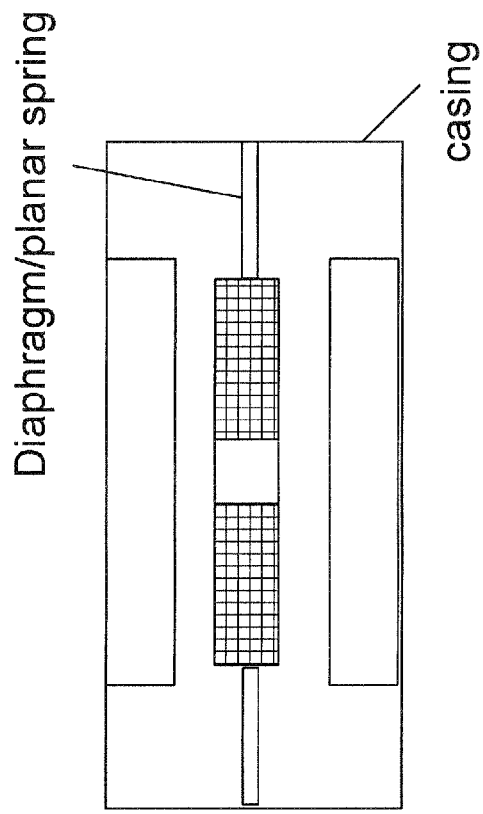
FIGS. 12A and 12B show embodiments where relative motion of the magnetic field and the coil are constrained by one or more linear bearings or one or more springs, respectively.
Figure 12A:
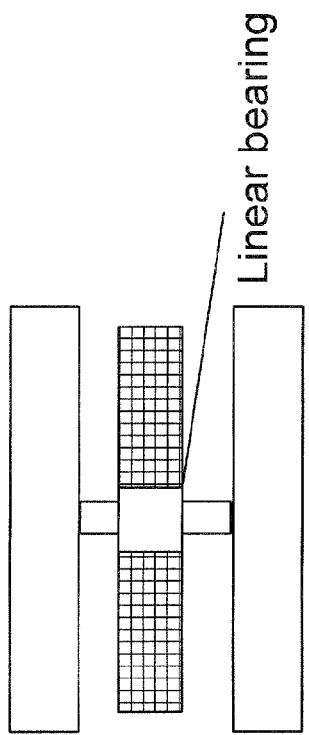

FIGS. 12A and 12B show embodiments where the relative motion between the magnetic filed and the coil can be constrained by one or more linear bearings or one or more springs, respectively. In a linear bearing implementation, a shaft can stand between the two plates, and the coil can be wound on a sliding ring that fits the shaft. Optionally, liquid can be added between the ring and the shaft to lubricate the contact. In a spring implementation, the coil can be glued to a planar spring or a diaphragm that is clamped, for example, by the easing.

Figure 13:
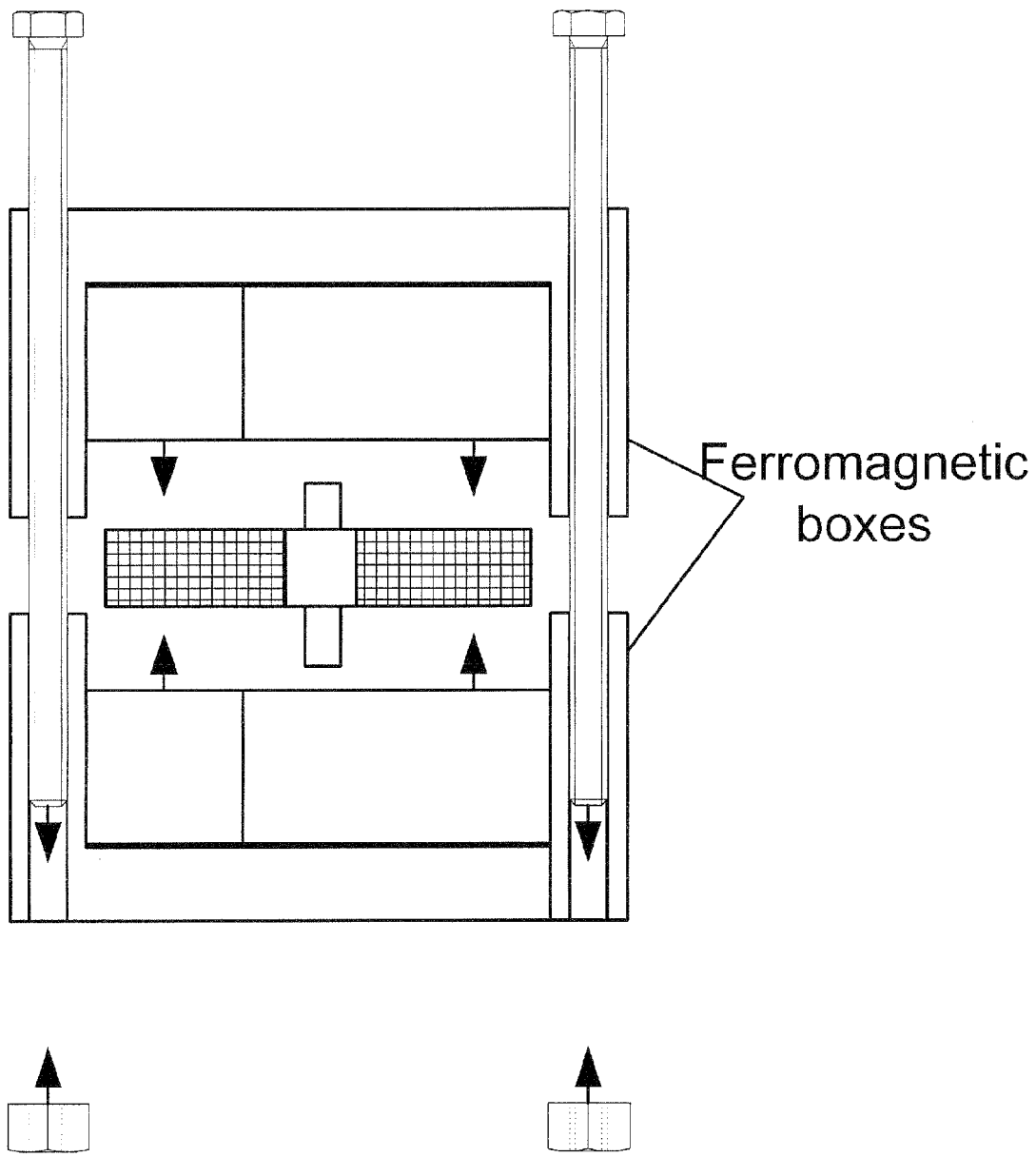
FIG. 13 shows an embodiment having magnets housed in a Ferromagnetic box.

In a specific embodiment, the assembly of the magnet plates can be facilitated by filling the magnets of each plate into ferromagnetic boxes, so that the attraction force between the magnets and the box can help hold the magnets in place. The ferromagnetic boxes can also function as the magnetic field shielding. The two boxes can be fastened by using bolts and nuts, through holes need to be drilled, as shown in FIG. 13.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A vibrational energy harvester, comprising:
   a conductive coil; and
   a magnet array, wherein the magnet array forms a cavity,
   wherein the magnet array produces internal magnetic fields within the cavity,
   wherein the internal magnetic fields have an internal magnetic field pattern,
   wherein the magnet array produces external magnetic fields in a region outside of the magnet array and outside of the cavity, wherein the external magnetic fields have an external magnetic field pattern,
   wherein an external maximum magnitude of the external magnetic field pattern is less than or equal to 20% of an internal maximum magnitude of the internal magnetic field pattern, wherein the external maximum magnitude is at least as large as any other magnitude of the external magnetic field pattern and the internal maximum magnitude is at least as large as any other magnitude of the internal magnetic field pattern,
   wherein the conductive coil is positioned with respect to the magnet array, and the vibrational energy harvester is configured, such that motion of the vibrational energy harvester causes relative motion between the conductive coil and the magnet array such that relative motion between the conductive coil and the magnet array results in a change in an amount of magnetic flux of the internal magnetic fields through the conductive coil that causes one or more of the following:
   an electric current in the conductive coil, and
   a voltage in the conductive coil.

2. The vibrational energy harvester according to claim 1, wherein the magnet array is a Halbach cylinder.

3. The vibrational energy harvester according to claim 1, wherein the magnet array comprises one or more magnets selected from the group consisting of: an arc-shaped permanent magnet, a trapezoidal-shaped permanent magnet, a square-shaped permanent magnet, and a rectangular-shaped permanent magnet.

4. The vibrational energy harvester according to claim 1, wherein the cavity is cylindrical.

5. The vibrational energy harvester according to claim 1, wherein the cavity has a rectangular cubic shape.

6. The vibrational energy harvester according to claim 1, wherein the internal ma pattern is a dipole magnetic field pattern.

7. The vibrational energy harvester according to claim 1, wherein the internal magnetic field pattern is a magnetic field pattern selected from the group consisting of: a quadrupole magnetic field pattern, a hexapole magnetic field pattern, and an octopole magnetic field pattern.

8. The vibrational energy harvester according to claim 1, wherein the magnet array comprises soft magnetic materials.

9. The vibrational energy harvester according to claim 1, wherein the conductive coil and the magnet array are interconnected via at least one spring,
   wherein the at least one spring constrains motion between the conductive coil and the magnet array.

10. The vibrational energy harvester according to claim 9, wherein one or more springs of the at least one spring constrains relative axial motion between the conductive coil and the magnet array.

11. The vibrational energy harvester according to claim 9, wherein one or more springs of the at least one spring constrains rotational motion of the conductive coil about a longitudinal axis of the conductive coil, wherein the longitudinal axis of the conductive coil is transverse to a coil axis of the conductive coil.

12. The vibrational energy harvester according to claim 9, wherein one or more springs of the at least one spring constrains rotational motion of the magnet array about a longitudinal axis of the magnet array.

13. The vibrational energy harvester according to claim 1, wherein the conductive coil and the magnet array are interconnected via at least one flexure, wherein the at least one flexure constrains the relative motion between the conductive coil and the magnet array.

14. The vibrational energy harvester according to claim 1, wherein the conductive coil is pivotally connected to the magnet array,
   wherein the conductive coil and magnet array rotate relative to each other about a pivot point such that an angle between a longitudinal axis of the conductive coil and a longitudinal axis of the magnet array changes as the conductive coil and magnet array rotate relative to each other about the pivot point.

15. The vibrational energy harvester according to claim 1, wherein the vibrational energy harvester fits within one or more standard battery form factors.

16. The vibrational energy harvester according to claim 1,
wherein the conductive coil and the magnet array are interconnected,
wherein the interconnection of the conductive coil and the magnet array constrains the relative motion between the conductive coil and the magnet array,
wherein the interconnection of the conductive coil and the magnet array constrains relative linear motion between the conductive coil and the magnet array in a direction parallel with a coil axis of the conductive coil,
wherein such constrained relative motion between the conductive coil and the magnet array causes the one or more of the following:
the electric current in the conductive coil; and
the voltage in the conductive coil,
wherein the internal magnetic field pattern is static with respect to the magnet array,
wherein the magnet array comprises
a first magnet plate; and
a second magnet plate,
wherein the first magnet plate and the second magnet plate are positioned such that a first plane in which the first plate lies and a second plane in which the second plane lies are substantially parallel,
wherein the cavity is formed between the first plate and the second plate,
wherein all the internal magnetic fields within a first annular volume of the cavity have a magnetic field component direction radially out from the line segment, wherein the first annular volume is centered around a line segment substantially perpendicular to the first plane and extends between a first radius from the line segment and a second radius from the line segment,
wherein when there is no relative linear motion between the conductive coil and the magnet array in the direction parallel with the coil axis of the conductive coil, the conductive coil is positioned between the first plate and the second plate such that at least a first annular portion of the conductive coil is within the first annular volume and such that the coil axis of the conductive coil has a component direction parallel with the line segment,
wherein the relative linear motion between the conductive coil and the magnet array in the direction parallel with the coil axis of the conductive coil causes the at least the first annular portion of the conductive coil to move in one or more of the following manners:
(i) within the first annular volume of the cavity; and
(ii) through the first annular volume of the cavity,
such that the relative linear motion between the conductive coil and the magnet array in the direction parallel with the axis of the conductive coil results in the change in the amount of magnetic flux of the internal magnetic fields through the conductive coil that causes the one or more of the following:
the electric current in the conductive coil; and
the voltage in the conductive coil.

17. The vibrational energy harvester according to claim 16, further comprising:
a linear bearing,
wherein the linear bearing guides the relative motion between the conductive coil and the magnet array,
wherein a longitudinal axis of the linear bearing is substantially parallel with the coil axis of the conductive coil.

18. The vibrational energy harvester according to claim 16,
wherein the first plate has a square outer circumference,
wherein the second plate has a square outer circumference,
wherein a gap between the first plate and the second plate is less than twice a side length of the first plate and less than twice a side length of the second plate.

19. The vibrational energy harvester according to claim 16,
wherein the first plate is positioned within a first ferromagnetic box,
wherein the second plate is positioned within a second ferromagnetic box.

20. The vibrational energy harvester according to claim 1,
wherein first internal magnetic fields in a first volume have a first magnetic field component direction in a first direction,
wherein second internal magnetic fields in a second volume have a second magnetic field component direction in a second direction that is an opposite direction to the first direction,
wherein the conductive coil is positioned, and the vibrational energy harvester is configured, such that the relative motion between the conductive coil and the magnet array comprises the conductive coil moving linearly in a direction substantially perpendicular to a coil axis of the conductive coil such that, as the conductive coil moves, a ratio of magnetic flux from the first internal magnetic fields passing through the conductive coil to magnetic flux from the second internal magnetic fields passing through the conductive coil changes, wherein the changing ratio of magnetic flux from the first internal magnetic fields passing through the conductive coil to magnetic flux from the second internal magnetic fields passing through the conductive coil results in the change in the amount of magnetic flux of the internal magnetic fields through the conductive coil that causes the one or more of the following:
the electric current in the conductive coil; and
the voltage in the conductive coil.

21. The vibrational energy harvester according to claim 1, wherein the external maximum magnitude is less than or equal to 2% of the internal maximum magnitude.

22. The vibrational energy harvester according to claim 1, wherein the external maximum magnitude is less than or equal to 0.2% of the internal maximum magnitude.

23. The vibrational energy harvester according to claim 1,
wherein the conductive coil and the magnet array are interconnected,
wherein the interconnection of the conductive coil and the magnet array constrains the relative motion between the conductive coil and the magnet array,
wherein such constrained relative motion between the conductive coil and the magnet array results in a change in an amount of magnetic flux of the internal magnetic fields through the conductive coil that causes the one or more of the following:
the electric current in the conductive coil; and
the voltage in the conductive coil.

24. The vibrational energy harvester according to claim 23,
wherein the conductive coil and the magnet array are interconnected so as to allow linear relative motion between the conductive coil and the magnet array in a direction parallel with an axis of the conductive coil, wherein the linear relative motion between the conductive coil and the magnet array in a direction parallel with an axis of the conductive coil results in a change in an amount of magnetic flux of the internal magnetic fields through the conductive coil that causes the one or more of the following:
the electric current in the conductive coil; and
the voltage in the conductive coil.

25. The vibrational energy harvester according to claim 1, wherein the one or more of the following:
the electric current in the conductive coil; and
the voltage in the conductive coil results from a non-zero EMF, where $$EMF=(\vec{B}\times\vec{l})\cdot\vec{v}$$

where $\vec{B}$ is the internal magnetic field, $\vec{l}$ is a length of conductor of the conductive coil, and $\vec{v}$ is a velocity of the length of conductor of the conductive coil.

26. The vibrational energy harvester according to claim 1, wherein the internal magnetic field pattern is static with respect to the magnet array.

27. The vibrational energy harvester according to claim 1, wherein the conductive coil is positioned within the cavity.

28. The vibrational energy harvester according to claim 27, further comprising:
at least one additional magnet array
wherein the at least one additional magnet array forms a corresponding at least one cavity,
wherein each of the at least one additional magnet array produces a corresponding at least one additional internal magnetic field within the corresponding cavity, wherein the at least one additional internal magnetic field has a corresponding at least one additional internal magnetic field pattern,
wherein each of the at least one additional magnet array produces a corresponding at least one additional external magnetic field in a region outside of the corresponding magnet array and outside of the corresponding cavity, wherein the at least one additional external magnetic field has a corresponding at least one external magnetic field pattern,
wherein a corresponding at least one additional maximum magnitude of the corresponding external magnetic field pattern is less than or equal to 20% of a corresponding internal maximum magnitude of the corresponding internal magnetic field pattern.

29. The vibrational energy harvester according to claim 1, further comprising:
at least one additional conductive coil,
wherein one or more additional conductive coils of the at least one additional conductive coil is positioned with respect to the magnet array, and the vibrational energy harvester is configured, such that motion of the vibrational energy harvester causes relative motion between the one or more additional conductive coils of the at least one additional conductive coil and the magnet array that results in a change in an amount of magnetic flux of the internal magnetic fields through the one or more additional conductive coils of the at least one additional conductive coil that causes one or more of the following:
a corresponding one or more electric currents in the one or more additional conductive coils of the at least one additional conductive coil and
a corresponding one or more additional voltages in the one or more additional conductive coils of the at least one additional conductive coil.

30. A method of harvesting vibrational energy, comprising:
providing a vibrational energy harvester, wherein the vibrational energy harvester comprises:
a conductive coil; and
a magnet array,
wherein the magnet array forms a cavity,
wherein the magnet array produces internal magnetic fields within the cavity, wherein the internal magnetic fields have an internal magnetic field pattern,
wherein the magnet array produces external magnetic fields in a region outside of the magnet array and outside of the cavity, wherein the external magnetic fields have an external magnetic field pattern,
wherein an external maximum magnitude of the external magnetic field pattern is less than or equal to 20% of an internal maximum magnitude of the internal magnetic field pattern,
wherein the conductive coil is positioned with respect to the magnet array and the vibrational energy harvester is configured such that motion of the vibrational energy harvester causes relative motion between the conductive coil and the magnet array such that relative motion between the conductive coil and the magnet array results in a change in an amount of magnetic flux of the internal magnetic fields through the conductive coil that causes one or more of the following:
an electric current in the conductive coil; and
a voltage in the conductive coil and
moving the vibrational energy harvester, wherein moving the vibrational energy harvester causes relative motion between the conductive coil and the magnet array such that relative motion between the conductive coil and the magnet array results in a change in an amount of magnetic flux of the internal magnetic fields through the conductive coil that causes the one or more of the following:
the electric current in the conductive coil; and
the voltage in the conductive coil.

31. The method according to claim 30,
wherein the conductive coil is pivotally positioned relative to the magnet array,
wherein the conductive coil rotates about a pivot point such that an angle between a first longitudinal axis of the conductive coil and a longitudinal axis of the magnet array changes as the conductive coil rotates about the pivot point, wherein the longitudinal axis of the conductive coil is transverse to a coil axis of the conductive coil.

32. The method according to claim 30,
wherein the conductive coil and the magnet array are interconnected,
wherein the interconnection of the conductive coil and the magnet array constrains the relative motion between the conductive coil and the magnet array,
wherein the interconnection of the conductive coil and the magnet array constrains relative linear motion between the conductive coil and the magnet array in a direction parallel with the coil axis of the conductive coil,
wherein such constrained relative linear motion between the conductive coil and the magnet array causes the one or more of the following:
the electric current in the conductive coil; and
the voltage in the conductive coil,
wherein the internal magnetic field pattern is static with respect to the magnet array,
wherein the magnet array comprises:
a first magnet plate; and
a second magnet plate, wherein the first magnet plate and the second magnet plate are positioned such that a first plane in which the first plate lies and a second plane in which the second plane lies are substantially parallel, wherein the cavity is formed between the first plate and the second plate, wherein all the internal magnetic fields within a first annular volume of the cavity have a magnetic field component direction radially out from the line segment, wherein the first annular volume of the cavity is centered around a line segment substantially perpendicular to the first plane and extends between a first radius from the line segment and a second radius from the line segment, wherein when there is no relative linear motion between the conductive coil and the magnet array in the direction parallel with the coil axis of the conductive coil, the conductive coil is positioned between the first plate and the second plate such that at least a first annular portion of the conductive coil is within the first annular volume and such that the coil axis of the conductive coil has a component parallel with the line segment, wherein the relative linear motion between the conductive coil and the magnet array in the direction parallel with the coil axis of the conductive coil causes the at least the first annular portion of the conductive coil to move in one or more of the following manners:
  (i) within the first annular volume of the cavity; and
  (ii) through the first annular volume of the cavity.

33. The method according to claim 30, wherein first internal magnetic fields in a first volume have a first magnetic field component direction in a first direction, wherein second internal magnetic fields in a second volume have a second magnetic field component direction in a second direction that is an opposite direction to the first direction, wherein the conductive coil is positioned, and the vibrational energy harvester is configured, such that the relative motion between the conductive coil and the magnet array comprises the conductive coil moving linearly in a direction substantially perpendicular to a coil axis of the conductive coil such that, as the conductive coil moves, a ratio of magnetic flux from the first internal magnetic fields passing through the conductive coil to magnetic flux from the second internal magnetic fields passing through the conductive coil changes, wherein the changing ratio of magnetic flux from the first internal magnetic fields passing through the conductive coil to magnetic flux from the second internal magnetic fields passing through the conductive coil causes the electric current and/or voltage in the conductive coil, wherein relative motion between the conductive coil and the magnet array in a first direction causes the electric current and/or voltage in the at least one conductive coil.

* * * * *

UNITED STATES PATENT AND TRADEMARK OFFICE
CERTIFICATE OF CORRECTION

| | | |
|---|---|---|
| PATENT NO. | : 9,041,230 B2 | Page 1 of 1 |
| APPLICATION NO. | : 12/968860 | |
| DATED | : May 26, 2015 | |
| INVENTOR(S) | : David Patrick Arnold et al. | |

It is certified that error appears in the above-identified patent and that said Letters Patent is hereby corrected as shown below:

In the Specification

Column 7,
Line 29, "the easing" should read --the casing--.

In the Claims

Column 8,
Line 25, "internal ma pattern" should read --internal magnetic field pattern--.

Signed and Sealed this
Eighth Day of December, 2015

Michelle K. Lee
*Director of the United States Patent and Trademark Office*